United States Patent [19]

Aronson

[11] 4,149,707
[45] Apr. 17, 1979

[54] SPRING DEVICE

[76] Inventor: Erik Aronson, Bokstigen 20, Lidingö, Sweden, S-181 46

[21] Appl. No.: 858,272

[22] Filed: Dec. 7, 1977

[30] Foreign Application Priority Data

Dec. 8, 1976 [SE] Sweden .............................. 7613774

[51] Int. Cl.$^2$ .............................................. F16F 1/06
[52] U.S. Cl. ...................................... 267/156; 267/59
[58] Field of Search ................ 188/1 B, 130, 9 R, 267/26, 57–59, 156, 167

[56] References Cited

U.S. PATENT DOCUMENTS

| 871,237 | 11/1907 | Robinson | 267/9 R |
|---|---|---|---|
| 1,470,148 | 10/1923 | Colstad | 267/9 R |
| 3,031,034 | 4/1962 | Thomas | 188/1 B |

Primary Examiner—Duane A. Reger

Attorney, Agent, or Firm—Ostrolenk, Faber, Gerb & Soffen

[57] ABSTRACT

A spring device comprises at least one elastic band which, in released or wound-up position, is rolled against the inside of an outer path and, in wound-up or released position, respectively, is rolled on the outside of a drum which is positioned within the outer path and is rotatable relative thereto. The band is adapted, as it is unrolled from the drum or vice versa, by the action of two or more members which are spaced at least substantially evenly along the periphery of the drum, to maintain its rolled-up position on respectively the outside of the drum and the inside of the outer path to a point from which it directly passes to, and is rolled up on respectively the inside of the outer path and the outside of the drum.

16 Claims, 17 Drawing Figures

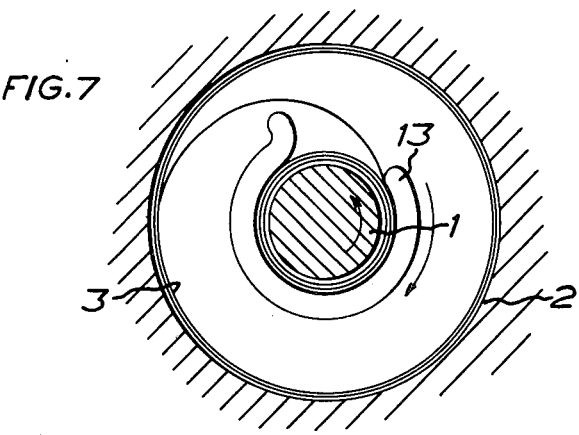
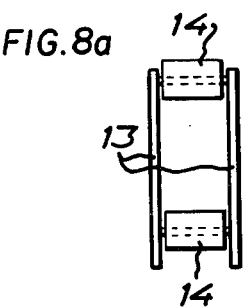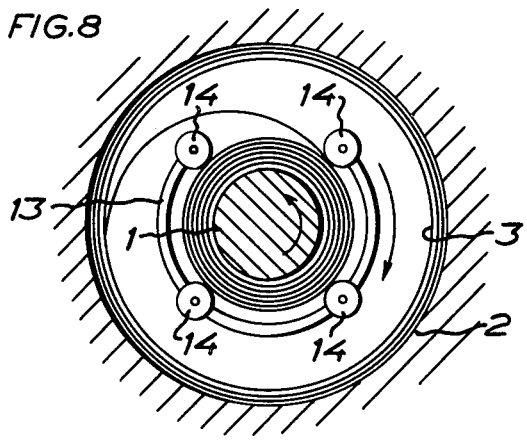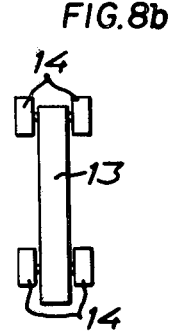
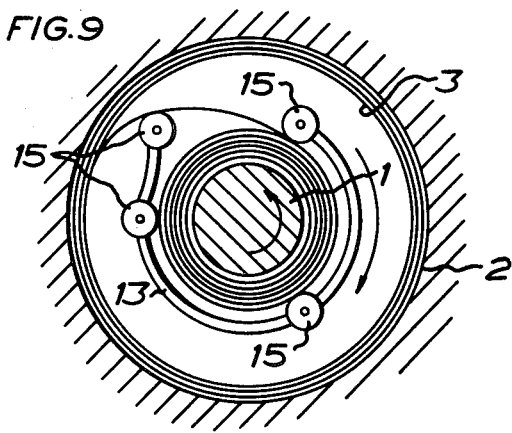

SPRING DEVICE

The invention thus relates to a spring device comprisisng at least one elastic band or the like which, in released or wound-up position, is rolled against the inside of an outer path and, in wound-up and released position, respectively, is rolled on the outside of a drum which is positioned within the outer path and is rotatable relative thereto, said spring device being characterized in that the band is adapted, as it is unrolled from the drum or vice versa, by the action of two or more members which are spaced at least substantially evenly along the periphery of the drum, to maintain its rolled-up position on respectively the outside of the drum and the inside of the outer path up to a point from which it directly passes to, and is rolled up on respectively the inside of the outer path and the outside of the drum.

According to a most important embodiment of the spring device the band or bands are bent over into a loop when passing between the drum and the outer path, so that the winding direction of the bands changes at the transition. When there are two or more bands and the loop-shaped transitions are at least substantially evenly spaced along the periphery of the drum, the loop-shaped transitions ensure that the bands maintain their rolled-up position on respectively the outside of the drum and the inside of the outer path, and for this reason it is not necessary to apply any specific means for this purpose.

According to another embodiment of the spring device the band or bands form a single or double bow when passing from the drum to the outer path so that the winding direction of the bands is maintained at the transition.

The invention will be described more in detail hereinbelow with reference to the accompanying drawings in which fifteen embodiments of the spring device are shown by way of example and in cross-section, and in which:

FIGS. 7 and 8 show spring devices where the band or bands pass from the drum to the outer path with maintained winding direction.

FIG 8a is a side view of an embodiment of a sleeve surrounding the drum of FIG. 8.

FIG. 8b is a side view of an alernate embodiment of a sleeve surrounding the drum of FIG. 8.

FIGS. 9 to 15 also show spring device in which the band or bands pass from the drum to the outer path while maintaining the winding direction.

Figure 1:
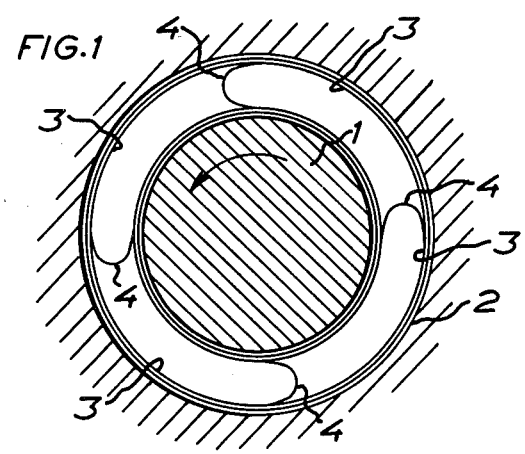
FIGS. 1-6 show spring devices where the band or bands are bent over into a loop at the transition between the drum and the outer path.

As is apparent from FIG. 1 the spring device comprises a drum 1 which is positioned within an outer path or guide 2 and is rotatable relative thereto. The device includes two or more elastic bands 3 which in released position are rolled against the inside of the path 2 and in wound-up position are rolled on the outside of the drum 1. At the transition between the drum 1 and the path 2 the bands 3 are bent over into a loop 4 so that the winding direction of the bands 3 changes at the transition. As the loops 4 are spaced at least substantially evenly along the periphery of the drum 1 the loops 4 will prevent the springs 3 from springing outwardly throughout their length. The stored energy will thereby be successively portioned out only at the transitions from the inner high-energy parts to the outer low-energy parts via the loops 4.

Figure 2:
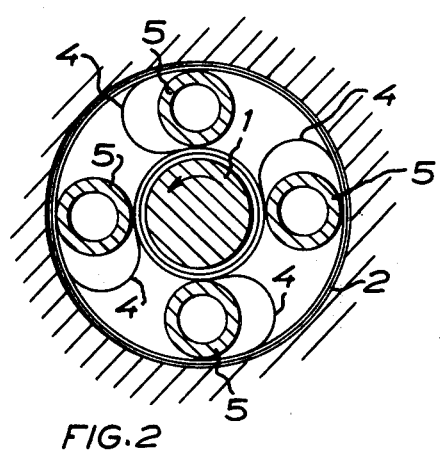

In some cases the force of the loops 4 which, as indicated above, will impede the tendency of the wound-up springs to spring outwardly throughout their length, will be insufficient, i.e. if the springs 3 are wound up in too many turns and/or if the radius of the drum 1 is too small in relation to the radius of curvature of the loops 4. This can be remedied by placing a number of rollers 5 between the drum 1 and the path 2. To this effect the rollers 5 should preferably be equal in number to the number of loops 4. The rollers 5 may suitably be made so large that they will substantially fill out the radial space between the inner and outer turns of the spring. The rollers 5 will thus urge the spring against both the drum 1 and the path 2, as appears from FIG. 2. The fact that the same rollers 5 can press the spring 3 both inwardly and outwardly is due to the fact that the rollers 5 can roll both against the inner and the outer part of the spring because the spring in the loop 4 changes direction.

Figure 3:
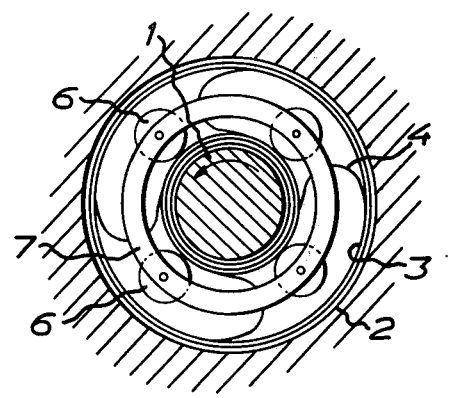

In the embodiment shown in FIG. 3 rollers 6 are arranged at a ring-shaped part or sleeve 7 enclosing the drum 1.

To make it possible to vary the spring force or moment in a certain manner during the unrolling operation the width and/or thickness of the bands may be varied or further band may be added piece by piece to the original bands.

To allow the supplementary band or bands, added piece by piece, to follow the bend of the main band in passing from the inner drum 1 to the outer path 2 each main band may be doubled and the supplementary band or bands may be placed between the main bands.

Figure 4:
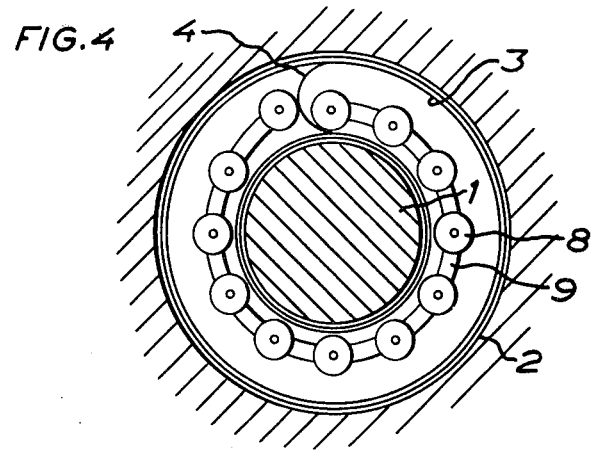
Figure 5:
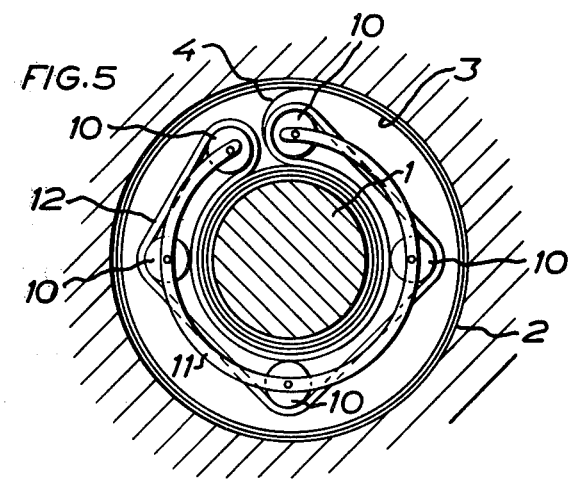

Two other ways of attaining the same effect are shown in FIGS. 4 and 5. According to FIG. 4 a substantial number of number of rollers 8 has been mounted on a ring 9 around the inner drum 1 so that an additional band has been forced to follow the main band 3 in passing from the inner drum 1 to the outer path 2. FIG. 5 shows five rollers 10 which have been mounted on two rings 11 and around which a flexible endless band 12 has been arranged with a length so adjusted that the band barely is stretched when it is applied on the spring 3 in the inner position thereof.

Another way of giving the spring a varying moment lies in giving the band or bands a varying bias, i.e. making the radius of curvature of the bands vary along the bands in unloaded condition. Thereby it will also be possible to change the signs of the moment, as in a balance-wheel. In this way it will also be possible to make the spring function quite inversely, i.e. in released condition it is rolled on the inner drum 1 and in wound-up position on the outer path 2. In a free, unloaded condition such a spring coils up and will have a diameter which is less than or equal to that of the inner drum 1. If supporting rollers with a ring according to FIG. 3 are used in this case, the rollers will urge the spring band outwardly towards the outer path 2.

Figure 6:
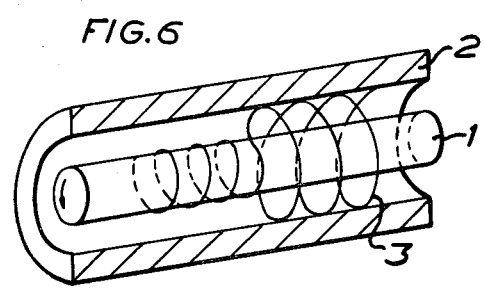

In the examples shown above one or more spiral springs have been used but such is not the case with the embodiment illustrated in FIG. 6. Thus, in this example, use is made of a preferably thread-shaped helical spring 3 the various turns of which are adapted to be wound beside each other on the inner drum 1 and the outer path 2. To the extent rollers are needed in this embodiment they should consist of pegs which should preferably be interconnected to provide the stability desired.

In the embodiments of FIGS. 7-15 the device according to this invention comprises in principle a conventional spiral spring 13 which, as appears from e.g. FIG. 7, is provided with a sleeve 13 or like means which is so positioned that it will surround the spring when this is wound up and thus prevent the spring from expanding throughout its length. The sleeve 13 has a slot through which the spring 3 can pass and be successively released. This will make the sleeve 13 turn in one direction and the unwinding inner drum in the other direction, as appears from FIG. 7. According to another embodiment the drum 1 may be stationary and the outer path 2 movable. In these cases the spring 3 forms a simple or double bow when passing from the drum 1 to the outer path 2 so that the winding direction of the spring 3 is maintained at the transition.

To reduce the friction between the sleeve 13 and the spring 3 during winding up as well as during unrolling, the sleeve 13 may be provided with rollers 14 and 15, as appears from FIGS. 8 and 9, respectively (see also FIGS. 8a and 8b). The sleeve 13 with the rollers may be formed in various ways, for instance as indicated in the two side views in FIG. 8, with two sleeves 13 or rings having rollers 14 interposed therebetween, or pairs of rollers 14 mounted on an intermediate sleeve 13 or ring.

To allow the spring force or moment to vary in a desired manner during the working cycle the width and/or thickness of the spring band may be varied or a further band may be added piece by piece to the original band.

Figure 10:
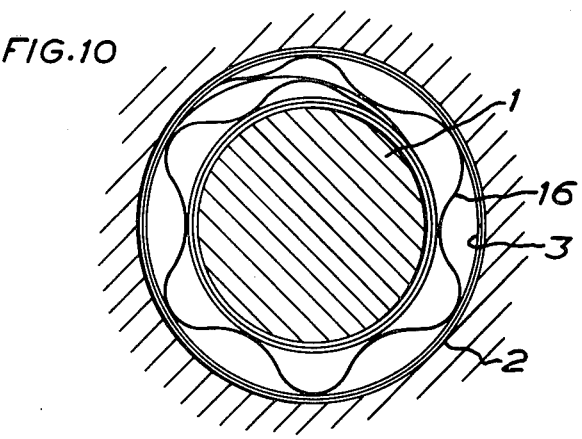

If the spring band 3 is completed with another band 16, which is somewhat longer than the first band 3 and is folded between the outer path 2 and the inner drum 1, it will be possible to dispense with the surrounding sleeve, as appears from FIG. 10. Instead of the sleeve the folds of the longer band 16 will prevent expansion of that part of the band 3 which is wound up on the drum 1.

Figure 11:
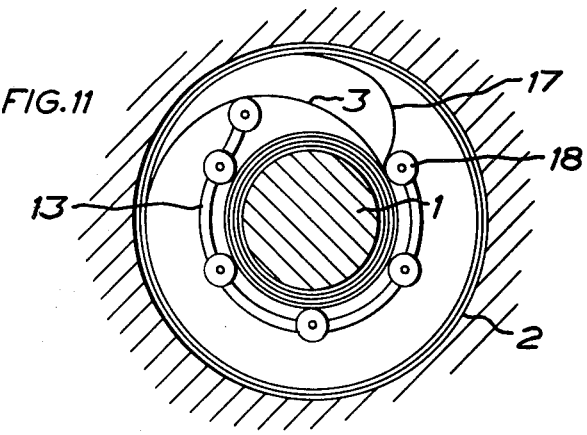

Also FIG. 11 shows a spring system having an additional band 17, slightly longer than the original one. The additional length of this band will produce a loop between the drum 1 and the path 2, which loop is bent to a higher degree than is the loop of the first band 3, resulting in a compressive force on the first roller 18 in the sleeve 13 which has a greater tangential component than has the compressive force from the first band 3. This facilitates turning of the sleeve 13.

Figure 12:
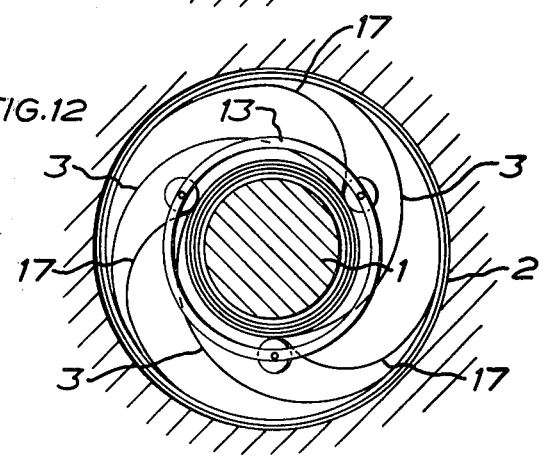

FIG. 12 shows essentially the same embodiment as FIG. 11 but this includes three pairs of spring bands 3, 17 and the sleeve 13 is formed according to the alternative shown in FIG. 8a. This will result in outbalancing of the radial forces on the surrounding sleeve 13.

Another way of giving the spring a varying moment consists in giving the band or bands a varying bias, i.e. the radius of curvature of the bands varies along the bands in unloaded condition. This will make it possible to change the signs of the moment, as in a balance-wheel. In this way it will also be possible to obtain a quite opposite function of the spring, i.e. in released position it is rolled up on the inner drum 1 and in wound-up position on the outer path 2. Such a spring coils up in free, unloaded condition to that it will have a diameter which is less than or equal to that of the inner drum 1. The sleeve 13 will then press the spring band outwardly, directly or possibly indirectly via its rollers, against the outer path 2.

Figure 13:
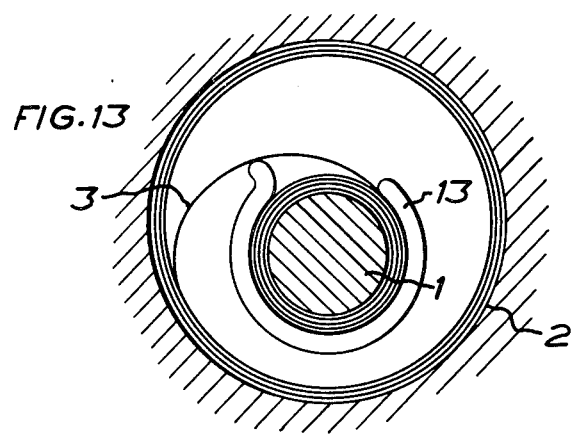
Figure 14:
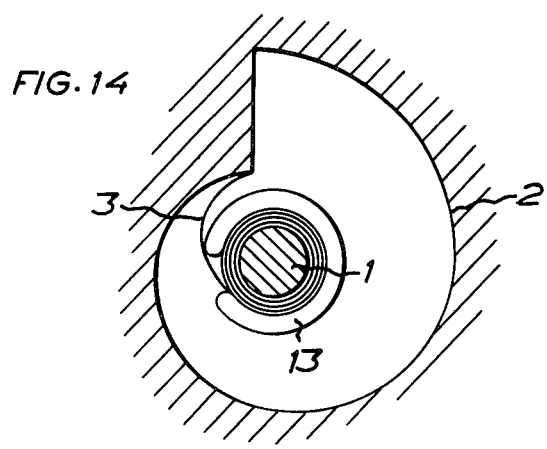

Still another way of providing a varying force or moment consists in placing the drum 1 or path 2 eccentrically relative to each other or giving the outer path 2 a non-circular form, as shown in FIGS. 13 and 14. In the embodiment of FIG. 13 the variation of force will repeat itself periodically while according to FIG. 14 it will be restricted to a few turns at least if the spring is plane. If the spring is helical it will be possible in principle to obtain an arbitrarily varying force through an arbitrary number of turns but the practical design of such a spring will be complicated since it is necessary to give the outer path the form of a helical spiral with varying radius.

When applying the invention to helical springs the sleeve will be tubular with a longitudinal slot through which the spring passes. To the extent rollers are required in this embodiment they should consist of pegs which suitably are interconnected in the manner illustrated by the side view of FIG. 8a.

Figure 15:
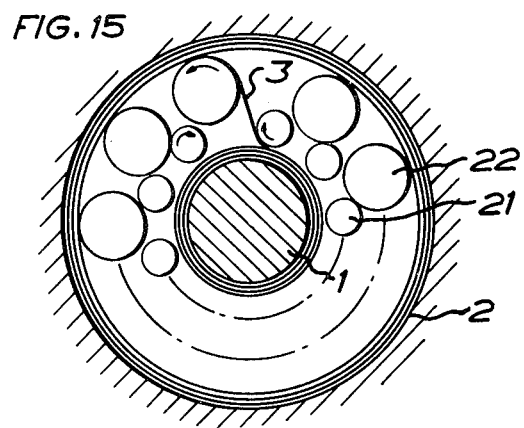

To ensure that the spring turns rolled out against the outer path 2 will lie against it and will not spread inwardly a number of additional rollers may be mounted on the sleeve or ring on a radius such that the rollers will press the spring outwardly against the outer path 2 without coming into contact with the innner portion of the spring. In this embodiment separate rollers should be used to urge the spring 3 against the inner drum 1 and the outer path 2, since the rollers will have opposite directions of rotation. This embodiment with double rows of rollers 19 and 20 is shown in FIG. 15. Here the rollers 19 and 20 also roll against each other.

If the sliding friction is sufficiently low to permit using a sleeve without rollers, as is the case according to FIG. 7, the sleeve will be made so thick that it will at least substantially fill out the space between the outer and inner spring turns.

To compensate for changes in the outer and inner diameters of the spring turns during the winding-up and release of the spring, the sleeve or the ring and/or the rollers may be made elastic.

Even if only one band has been shown in some of the embodiments described, several bands may as a rule be utilized, inter alia to obtain outbalancing of the radial forces, as described with reference to FIG. 12.

Instead of elastic bands, another suitable material, such as spring wire, may be used in the springs.

The invention is not restricted to that which has been described above and shown in the drawings but may be modified within the scope of the following claims.

What I claim and desire to secure by Letters Patent is:

1. A spring device comprising at least one elastic band or the like, an outer guide path for said band; a drum positioned within and spaced from said guide path; said band having a plurality of turns; said band in released or wound-up position, being rolled against the inside of said outer guide path and, in wound-up and released position, respectively, being rolled on the outside of said drum; said drum being rotatable with respect to said outer guide path means comprising at least two members spaced substantially evenly along the periphery of the drum, said last mentioned means being adapted, as the band is rolled and unrolled from the drum to maintain the rolled-up position of the band on respectively the outside of the drum and the inside of the outer path to a point from which it directly passes to, and is rolled up on respectively the inside of the outer path and the outside of the drum.

2. A spring device as claimed in claim 1, wherein each of said last mentioned means for maintaining said band in position comprises a loop of the band passing between the drum and the outer path so that the winding direction of the band changes at the transition.

3. A spring device as claimed in claim 2, wherein said band forms an additional loop when passing from the drum to the outer path so that the winding direction of the bands is maintained at the transition.

4. A spring device as claimed in claim 1, wherein the drum is surrounded by rollers, additional means surrounding said drum adapted to cooperate with the band in order to maintain it in rolled-up position on the outside of the drum, said additional means having at least one passage through which the band is adapted to pass from the drum to the outer path.

5. A spring device as claimed in claim 4, wherein said additional means are also adapted to cooperate with the band at the outer path.

6. A spring device as claimed in any of claims 1, wherein the drum has a circular cross-section and is concentrically arranged within the outer path which is circular, whereby the moment is practically constant throughout the working cycle.

7. A spring device as claimed in any of claims 6, wherein the drum and the outer path have arbitrary cross-sections and the drum has an arbitrary mounting point relative to the outer path, whereby the moment varies with respect to these factors.

8. A spring device as claimed in claim 1, wherein a plurality of elastic bands are provided, said bands passing directly to the outer path from points which are evenly spaced along the periphery of the drum.

9. A spring device as claimed in claim 8, wherein each elastic band is combined with further bands of another length.

10. A spring device as claimed in claim 8, wherein each elastic band varies in dimensions throughout its length.

11. A spring device as claimed in claim 1, wherein each band is adapted to be rolled as a spiral spring.

12. A spring device as claimed in claim 8, wherein each elastic band is adapted to be rolled as a helical spring.

13. A spring device as claimed in claim 8, wherein each band has a predetermined bias, whereby the moment varies with respect to this bias.

14. The spring device of claim 4 wherein said additional means comprises rollers spaced from each other.

15. The spring device of claim 4 wherein said additional means comprises a sleeve surrounding said drum and spaced therefrom.

16. The spring device of claim 15 wherein said sleeve carries a plurality of spaced rollers.

* * * * *